US009327445B1

(12) United States Patent
Boone

(10) Patent No.: US 9,327,445 B1
(45) Date of Patent: May 3, 2016

(54) METHOD AND MEANS FOR ACCENTING A WHEEL

(71) Applicant: David W. Boone, Omaha, NE (US)

(72) Inventor: David W. Boone, Omaha, NE (US)

(\*) Notice: Subject to any disclaimer, the term of this patent is extended or adjusted under 35 U.S.C. 154(b) by 0 days.

(21) Appl. No.: 14/159,574

(22) Filed: Jan. 21, 2014

(51) Int. Cl.
| | |
|---|---|
| *B32B 37/06* | (2006.01) |
| *B32B 38/04* | (2006.01) |
| *B60R 13/04* | (2006.01) |
| *B60B 1/00* | (2006.01) |
| *B60B 5/00* | (2006.01) |
| *G09F 21/04* | (2006.01) |
| *B29C 65/02* | (2006.01) |
| *B60B 7/00* | (2006.01) |
| *B44C 5/00* | (2006.01) |
| *B60R 13/00* | (2006.01) |
| *B60B 5/02* | (2006.01) |
| *B32B 27/30* | (2006.01) |

(52) U.S. Cl.
CPC . *B29C 65/02* (2013.01); *B60B 7/00* (2013.01); *B32B 27/30* (2013.01); *B32B 37/06* (2013.01); *B32B 38/04* (2013.01); *B44C 5/00* (2013.01); *B60B 1/00* (2013.01); *B60B 5/02* (2013.01); *B60R 13/005* (2013.01); *B60R 13/04* (2013.01); *G09F 21/043* (2013.01); *G09F 21/045* (2013.01); *Y10T 156/1064* (2015.01)

(58) Field of Classification Search
CPC ........ B32B 27/30; B32B 37/06; B32B 37/00; B32B 38/04; B44C 5/00; B60R 13/04; B60R 13/005; G09F 21/045; G09F 21/043; Y10T 156/1064; Y10T 156/1083; B60B 1/00; B60B 5/00; B60B 5/02; B60B 2310/318; B60B 2310/656; B60B 2310/658; B60B 2900/572

See application file for complete search history.

(56) References Cited

U.S. PATENT DOCUMENTS

| | | | | |
|---|---|---|---|---|
| 3,214,220 | A | \* 10/1965 | Foster et al. | ............. 301/64.302 |
| 3,992,787 | A | \* 11/1976 | Lynch | .................... G09B 27/00 434/106 |
| 4,594,125 | A | \* 6/1986 | Watson | ......................... 156/516 |
| 5,549,940 | A | \* 8/1996 | Noone | ............................ 428/31 |
| 6,200,411 | B1 | 3/2001 | Eikhoff et al. | |
| 7,494,192 | B2 | 2/2009 | Chase et al. | |

(Continued)

FOREIGN PATENT DOCUMENTS

| | | | |
|---|---|---|---|
| CN | 201317221 | \* | 9/2009 |
| CN | 102218973 A | \* | 10/2011 |

(Continued)

OTHER PUBLICATIONS

Marvelous Tint Solutions, 9477 Greenback Lane, Suite 204, Folsom, CA 95630; web site: http://marveloustintsolutions.com/customwheels.html; date unknown.

(Continued)

*Primary Examiner* — Linda L Gray
(74) *Attorney, Agent, or Firm* — Dennis L. Thomte; Thomte Patent Law Office LLC

(57) ABSTRACT

A method and means for accenting a wheel. The means for accenting the wheel comprises design segments comprised of a wrap film. The method of this invention comprises the steps of: (1) providing a plurality of vinyl film segments; (2) positioning the design segments onto portions of the wheel so that the design segments are spaced-apart from one another; and (3) applying pressure to the design segments to adhere the design segments to the wheel.

2 Claims, 4 Drawing Sheets

(56) References Cited

U.S. PATENT DOCUMENTS

| | | | |
|---|---|---|---|
| 8,405,245 B1* | 3/2013 | Clay, II | 307/10.1 |
| 2004/0196647 A1* | 10/2004 | Palmer et al. | 362/84 |
| 2006/0082213 A1* | 4/2006 | Tirado | 301/37.109 |
| 2007/0018496 A1* | 1/2007 | McCorquodale | 301/37.11 |
| 2009/0008955 A1 | 1/2009 | Desoto | |
| 2012/0101612 A1* | 4/2012 | Thompson | 700/97 |
| 2012/0275171 A1* | 11/2012 | Fleet | G04B 47/046 362/382 |
| 2013/0069422 A1* | 3/2013 | Li | B60B 1/06 301/104 |
| 2014/0152078 A1* | 6/2014 | Noriega | 301/37.26 |
| 2015/0028659 A1* | 1/2015 | Jabourian et al. | 301/37.24 |
| 2015/0061354 A1* | 3/2015 | Tanaka | 301/64.101 |

FOREIGN PATENT DOCUMENTS

| | | | |
|---|---|---|---|
| CN | 2020088796 | * | 12/2011 |
| JP | 004813411 B2 | * | 3/2007 |

OTHER PUBLICATIONS

House of Grafx, PO Box 143, White Lake, NY 12786; web site: http://houseofgrafx.com/; Vinyl Wheel Rim Decals; date unknown.
Wrapped World, web site: http://www.wrappedworld.com/custom-rim-vinyl-wrapping-dk-cu; Feb. 27, 2013 post.
Wheelcals, Doug Falwell, 860-306-5066; web site: http://www.wraps4wheels.com.;date unknown.

* cited by examiner

METHOD AND MEANS FOR ACCENTING A WHEEL

BACKGROUND OF THE INVENTION

1. Field of the Invention

This invention relates to a method and means for accenting a wheel such as an automotive wheel, a truck wheel, a motorcycle wheel, an all-terrain vehicle wheel, etc. More particularly this invention relates to design segments which are comprised of a vinyl film and which are placed onto a wheel and adhered thereto.

2. Description of the Related Art

Many vehicle owners take great pride in the appearance of the wheels of their vehicles and go to considerable expense to purchase chrome wheels and other aesthetically appearing wheels. In some cases, the vehicle owner will purchase fancy wheel covers which completely cover the wheels of their vehicles. Such wheel covers are quite expensive and are frequently stolen.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

The method of this invention comprises the following steps: (1) providing a vinyl film; (2) cutting a design segment from the vinyl film; (3) positioning the design segment on a portion of the wheel; (4) applying pressure to the design segment to adhere the design segment to the wheel; and (5) applying heat to the design segment to further adhere the design segment to the wheel. In most cases, several of the design segments will be secured to the wheel. The configuration of the design segments will vary depending upon the owner's wishes and the particular wheel to which the segments are secured. The means of this invention is the design segment itself which will normally be cut from a sheet of vinyl film such as cast vinyl, dual cast vinyl film, calendered vinyl, etc.

It is therefore an object of this invention to provide a method and means for accenting a wheel.

A further object of the invention is to provide a relatively inexpensive way to accent a wheel.

A further object of this invention is to provide a method and means for enhancing the appearance of a wheel.

Still another object of the invention is to provide a method and means for enhancing the appearance of a wheel which is relatively simple.

Yet another object of the invention is to provide a method and means for accenting a wheel which is economical, durable in use and refined in appearance.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT AND METHOD

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
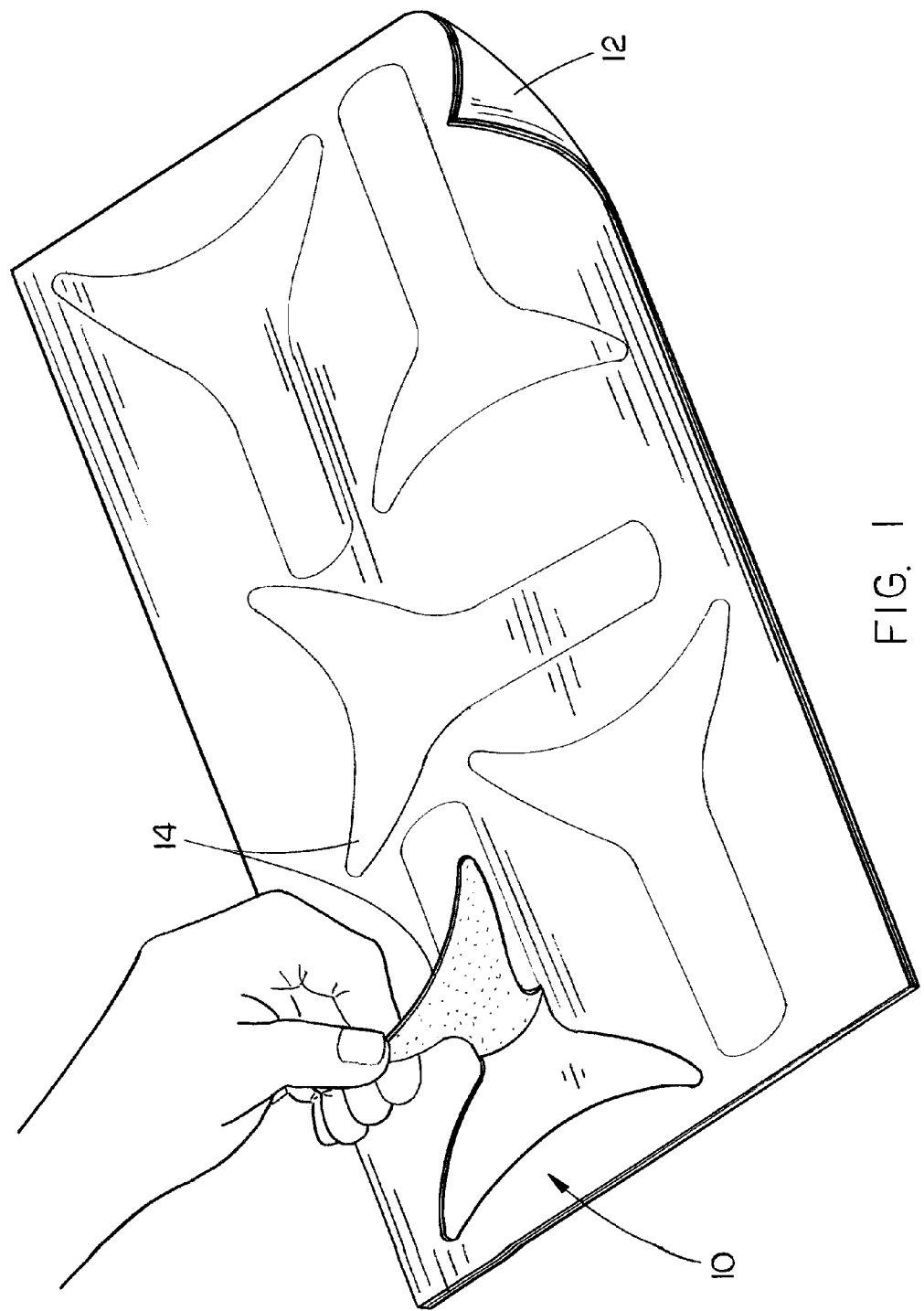
FIG. 1 is a perspective view illustrating one of the design segments being removed from a sheet of vinyl film.

In FIG. 1, the numeral 10 refers to a sheet of material which is used in this invention with the sheet 10 being temporarily adhered to a backing sheet 12. The material 10 is a cast vinyl film which is available from two different sources. One source is Avery Dennison which identifies the product as Avery Dennison® SW 900 Supreme Wrapping Film. Avery Dennison describes the product as a cast vinyl film covered by U.S. Pat. Nos. 6,630,049; 7,060,351; and 7,344,618. Another source of the material 10 is 3M. 3M describes the product as 3M™ Scotchprint® Wrap Film Series 1080. 3M also describes the material as a dual cast film. Although the preferred material is a cast vinyl film, the material could be other material such as dual cast vinyl film, calendered vinyl, or other suitable materials.

The sheet of material 10 is cut to create a plurality of design segments 14 which may take any shape depending on the particular parts of the wheel 16 to be accented and depending on the particular wheel which is to be accented. The wheel 16 may be an automotive wheel, a motorcycle wheel, a truck wheel, an all-terrain vehicle, or any other wheel.

Figure 2:
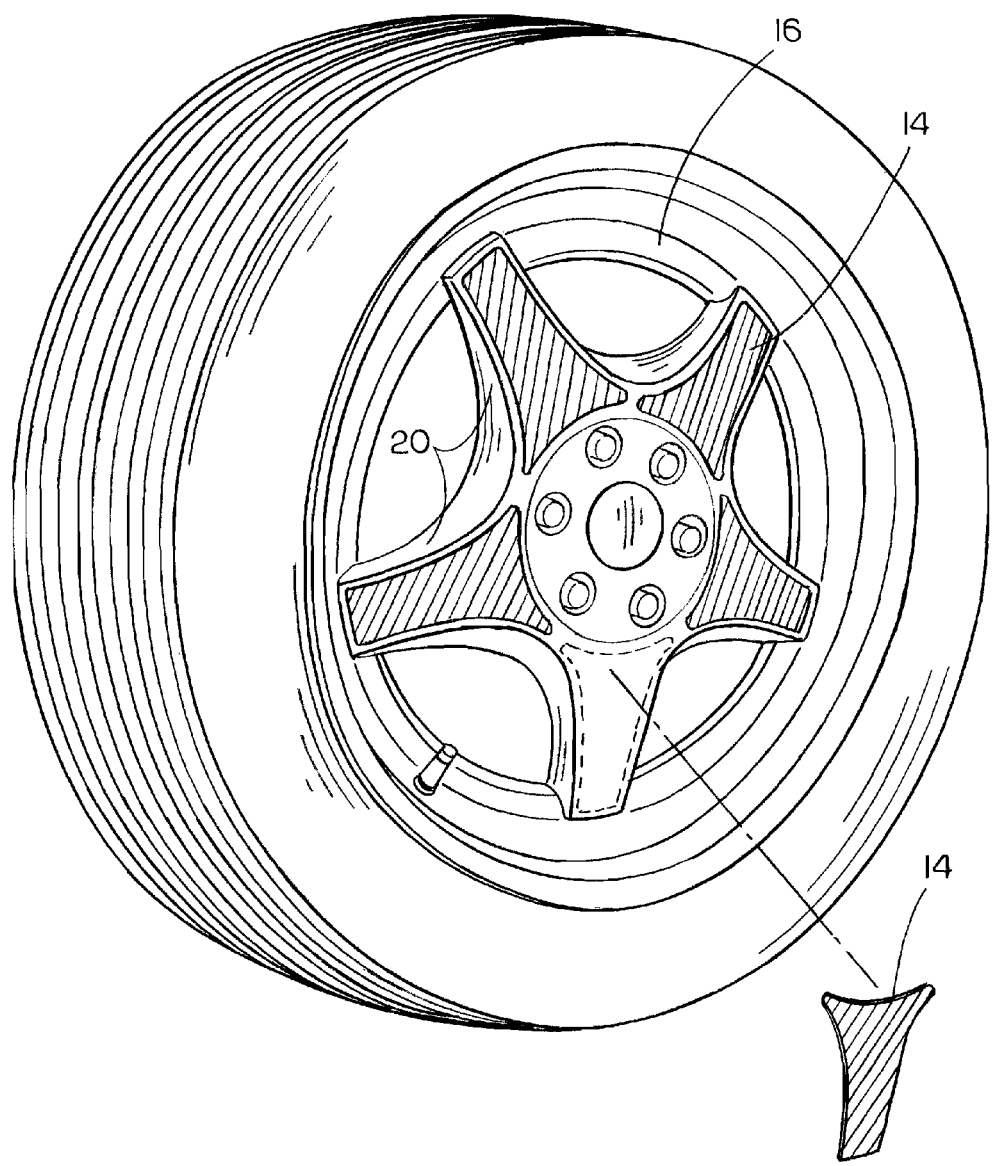
FIG. 2 is a perspective view illustrating design segments being positioned or placed on a wheel.

The wheel 16 is accented as will now be described. The wheel 16 is first thoroughly cleaned. The design segments 14 are then removed from the backing sheet 12 and positioned on the wheel 16 as illustrated in FIG. 2. After the design segments 14 have been placed or positioned on the wheel 16 in the proper position, the installer presses the design segments 14 against the wheel 16 to adhere the design segments 14 to the various parts of the wheel 16. The design segments 14 are then heated by a heat gun 18 to firmly adhere the design segments 14 to the wheel 16. In certain situations, it may not be necessary to heat the design segments 14 but it is preferred that the design segments 14 be heated.

Figure 3:
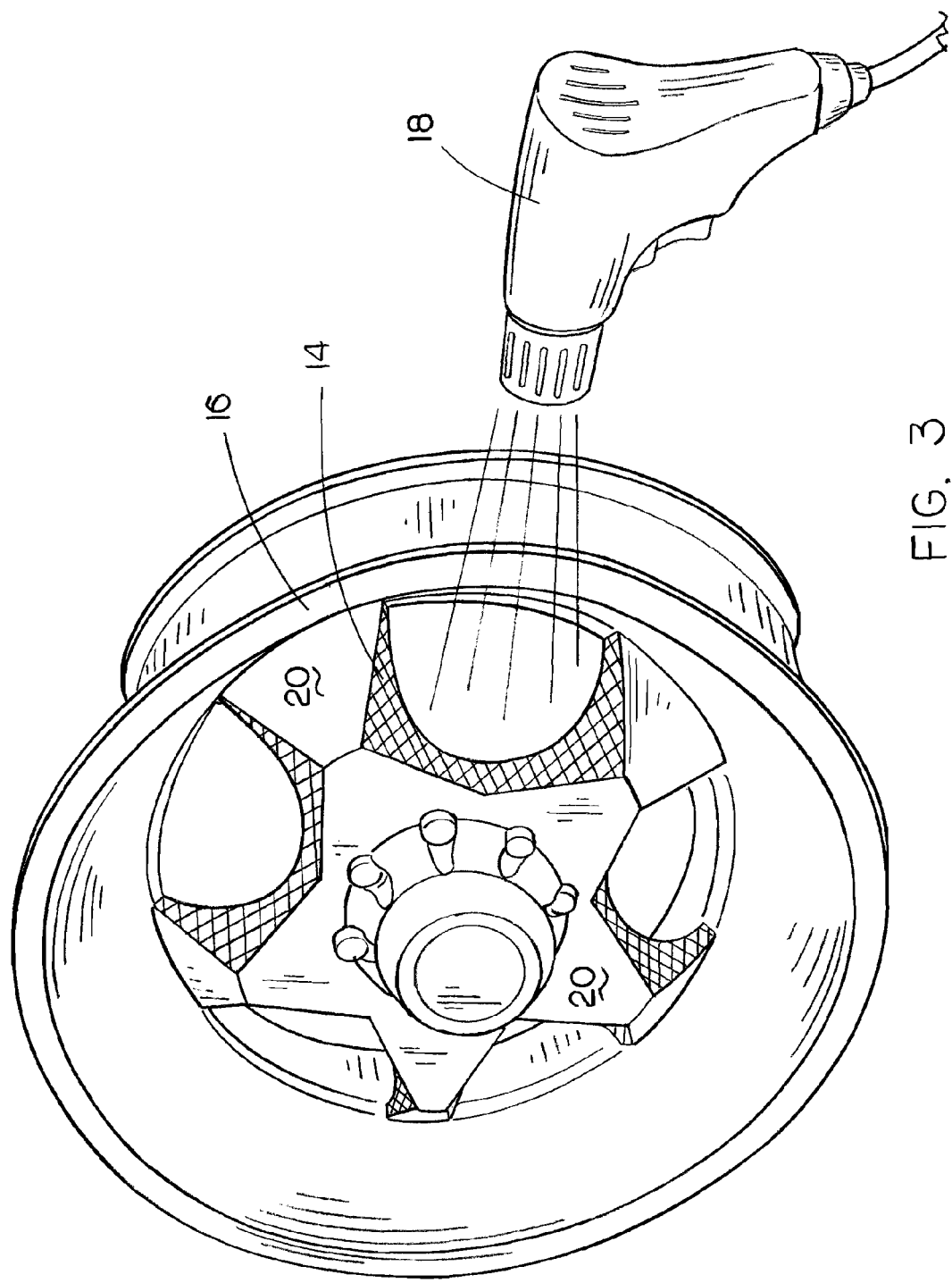
FIG. 3 is a perspective view illustrating the design segments which have been placed on a wheel being heated to enhance the adherence of the design segments to the wheel.
Figure 4:
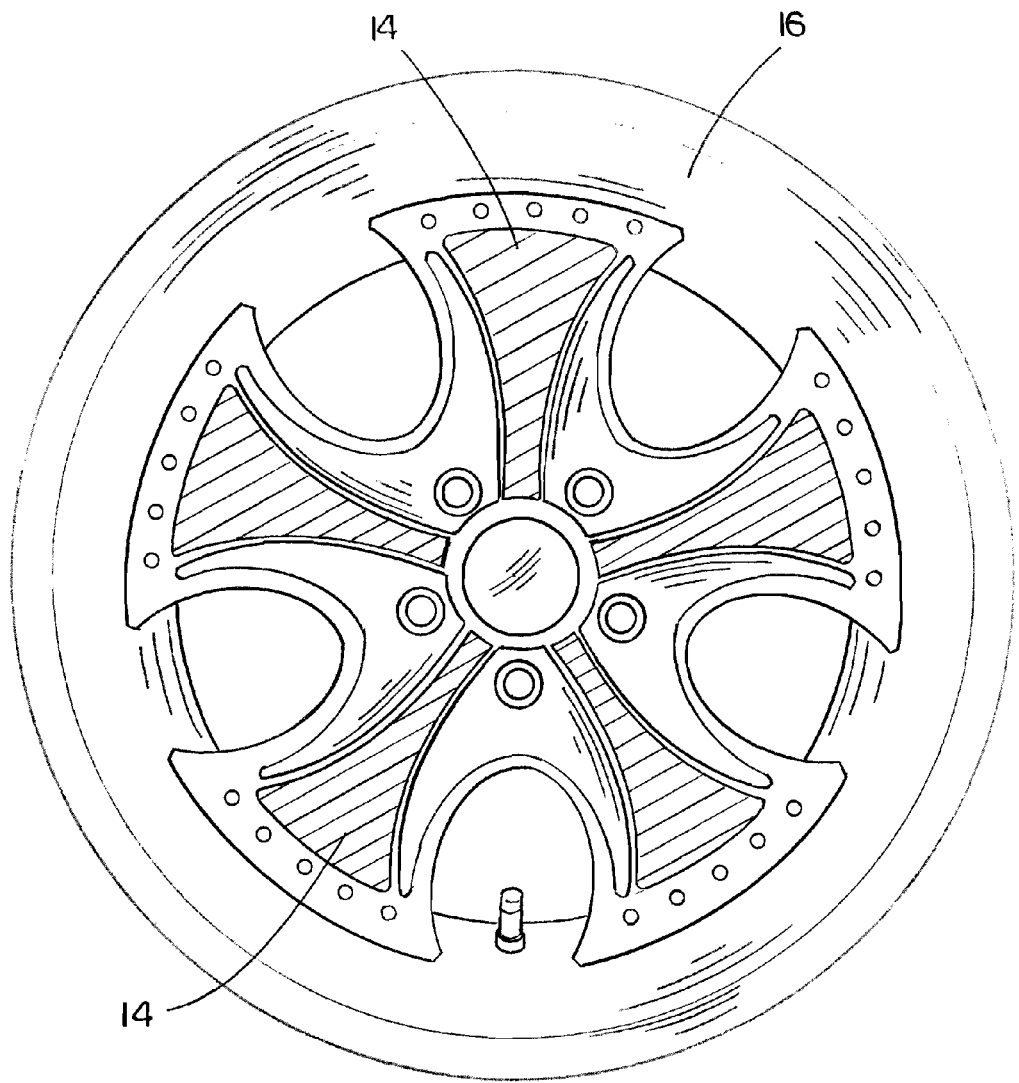
FIG. 4 is a side view of a wheel which has been accented with a plurality of design segments.

FIG. 3 illustrates that the design segments 14 are adhered to the sides of the spokes 20 of the wheel 16. FIG. 4 illustrates that the design segments 14 are adhered to the faces of the spokes of the wheel 16.

The design segments will normally be colored. The design segments accent the wheel 16 and enhance the appearance of the wheel in a relatively inexpensive fashion.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A method of accenting a wheel having a plurality of radially extending and spaced-apart elongated spokes, having inner and outer ends, with the spokes having spaced-apart sides having first and second ends and which extend between adjacent spokes and an elongated face therebetween which has inner and outer face-ends, comprising the steps of:

providing a flexible colored vinyl film adhered to a backing sheet;

cutting a plurality of identical first flat design segments having a curved configuration in the vinyl film, without cutting the backing sheet, with the flat design segments having first and second first-design-segment-ends and a shape which corresponds to the sides of the spokes;

cleaning the wheel;

manually removing the first flat design segments from the backing sheet;

manually positioning the removed first flat design segments on the sides of the spokes so as to substantially cover the sides of the spokes;

manually applying pressure to the first flat design segments positioned on the sides of the spokes to adhere the first flat design segments to the sides of the spokes; and applying heat, using a heating gun, to the first flat design segment manually pressed on the sides of the spokes to further adhere the first flat design segments to the sides of the spokes of the wheel.

2. The method of claim 1 further including the steps of:

cutting a plurality of identical second flat design segments in a flexible colored vinyl film adhered to a backing sheet, without cutting the backing sheet adhered to the second flat design segments, with the second flat design segments having inner and outer second-design-segment-ends and a shape which corresponds to the elongated faces of the spokes;

manually removing the second flat design segments from the backing sheet adhered to the second flat design segments;

manually positioning the removed second flat design segments on the faces of the spokes so as to substantially cover the faces of the spokes;

manually applying pressure to the second flat design segments positioned on the faces of the spokes to adhere the second flat design segments to the faces of the spokes; and applying heat, using a heating gun, to the second flat design segment manually pressed on the faces of the spokes to further adhere the second flat design segments to the faces of the spokes of the wheel.

* * * * *